United States Patent [19]

Roy

[11] Patent Number: 4,462,161

[45] Date of Patent: Jul. 31, 1984

[54] SHUT HEIGHT MEASURING DEVICE

[76] Inventor: Armand E. Roy, 95 Payson St., Attleboro, Mass. 02703

[21] Appl. No.: 395,453

[22] Filed: Jul. 6, 1982

[51] Int. Cl.³ .............................................. G01B 3/30
[52] U.S. Cl. ................. 33/147 R; 33/185 R; 33/181 R; 33/172 R
[58] Field of Search ............ 33/172 R, 185 R, 180 R, 33/181 R, 169 R, 147 R; 100/99, 257; 425/169, 171; 83/468, 522

[56] References Cited

U.S. PATENT DOCUMENTS

| 1,427,773 | 9/1922 | Barrett | 33/147 K |
| 2,873,533 | 2/1959 | Wilson | 33/147 K |
| 3,673,694 | 7/1972 | Adam et al. | 33/185 R |
| 4,081,910 | 4/1978 | Hammond | 33/181 R |
| 4,334,363 | 6/1982 | Stegemeyer et al. | 33/147 R |

FOREIGN PATENT DOCUMENTS 227940  7/1925  United Kingdom ............ 33/172 R

Primary Examiner—Harry N. Haroian
Attorney, Agent, or Firm—Salter & Michaelson

[57] ABSTRACT

A device for measuring the shut height of a press in the adjustment thereof to accomodate various die sets. The device is positionable on the bolster plate of a press and is engageable by the ram thereof as the press is advanced through its cycle. After the press has been cycled through its shut position, the device provides a relative reading which corresponds to the shut height of the press to facilitate the adjustment of the press to accomodate a particular die set.

5 Claims, 6 Drawing Figures

SHUT HEIGHT MEASURING DEVICE

BACKGROUND AND SUMMARY OF THE INVENTION

The instant invention relates to stamping presses and the like, and more particularly, to a novel measuring device for facilitating the adjustments of the shut heights of stamping presses.

Presses are widely used in the manufacturing industry to form elements or components for a wide variety of applications. Conventional presses generally include first and second press members, the first of which comprises a stationary member generally referred to as a bolster plate, and the second of which is movable toward and away from the first and is generally referred to as a ram. The bolster plate and the ram are adapted to carry material engaging elements called a die set whereby material engaged by the elements is formed as desired in the press. In this regard, the upper and lower die set elements, referred to as the punch and the die, respectively, are formed in generally complimentary interfitting configurations whereby they cooperate to form material interposed therebetween as the ram is moved into proximity with the bolster plate.

It is obvious that due to the wide variety of applications for presses of the above described type, each press must be adaptable for use with a variety of different die sets. Further, it is obvious that each die set must be specifically designed for each particular application, and that therefore the configurations and dimensions of different die sets can vary substantially. The thicknesses of work piece materials engaged by die sets can also vary substantially depending on the particular applications.

Accordingly, it is necessary to adjust the shut height of a press (the distance between the ram and the bolster plate when the ram is in its lowermost position) each time a new die set is used. Adjustments of this type are effected by adjusting the ram or the bolster plate of a press, or both, depending on the particular press, to achieve the desired postions of maximum relative proximity. Heretofore adjustments of this nature have been effected by time consuming trial and error methods which have required operators to make visual estimates of desired shut height settings and thereafter conduct test pressings to obtain the desired settings.

The instant invention provides a novel shut height measuring device which substantially simplifies press shut height adjustment procedures. More specifically, the instant invention provides a device for accurately measuring the distance between the ram and the bolster plate of a press when the ram is in the lowermost position of its cycle. Accordingly, when the device of the instant invention is utilized in combination with previously tabulated shut height data pertaining to a particular press-die set combination, adjustments of the press to obtain the desired shut height for the particular die set may be quickly and accurately effected without the costly and time consuming heretofore known methods. In this connection, it is obvious that the first time a die set is used in a particular press, the conventional trial and error steps must be used to obtain the desired shut height setting. However, by recording the desired shut height data for a particular die set-press combination as measured using the device of the instant invention, subsequent installations of the same die set in the press can quickly and easily be effected without trial and error steps.

The device of the instant invention generally comprises a substantially flat base member, a post which extends substantially perpendicularly upwardly from the base member, a slide block which is slidably mounted on the post, a slide rod which is mounted on the slide block and extends a predetermined distance upwardly therefrom in substantially parallel relation to the post, and a measuring element which is mounted on the slide block and which is operable to determine the position of the slide block relative to the base. In the preferred embodiment, the device also includes upper stop means which defines the uppermost position of the block on the post and clutch means which frictionally engages the post to adjustably retain the slide block at various relative positions thereon.

In use, the base is positioned on the bolster plate of a press and the press is then operated to cycle the ram through its position of maximum proximity with the bolster plate. As the ram moves downwardly in its cycle, it engages the upper end of the slide rod and moves it downwardly until the ram reaches its shut height position. The clutch means in the device holds the slide block on the post at the shut height position despite upward movement of the ram as it passes through its cycle. Accordingly, the reading on the measuring element can thereafter be used to determine the shut height of the press. In the preferred embodiment, the measuring element actually functions to indicate a relative value representing the distance of downward travel of the block from its uppermost position. If desired, the absolute shut height can be calculated by subtracting this relative value from the distance between the uppermost and lowermost points of the device when the block is in its uppermost position.

Devices representing the closest prior art to the instant invention of which the applicant is aware are disclosed in the U.S. Pat. No. 2,818,798 to Deykin; Webster, U.S. Pat. No. 3,051,078; Munschauer, Jr. et al, U.S. Pat. No. 3,162,232; Baker, U.S. Pat. No. 3,192,751; Holben, U.S. Pat. No. 3,246,496; Bergman, U.S. Pat. No. 3,334,581; Helrigel et al, U.S. Pat. No. 3,687,069; Baker, U.S. Pat. No. 4,033,252; Gundal, U.S. Pat. No. 4,133,260; Spanke et al, U.S. Pat. No. 4,166,415 and Hemmelgarn, U.S. Pat. No. 4,206,701. Of these patents, the U.S. Pat. No. 4,033,252 to Baker, and Helrigel et al, U.S. Pat. No. 3,687,069 relate to presses which include shut height indicating means while the other patents relate more generally to presses per se. None of the above patents, however, disclose or teach a measuring device which functions in the novel and simple way of the device of the instant invention and which is not an integral part of a press so that it can be used with a plurality of different presses. Further, the indicating devices disclosed in the above patents have substantial structural differences from the device of the instant invention and do not include clutch means for holding a shut height reading on the device as a press follows through in its cycle.

Accordingly, it is a primary object of the instant invention to provide a device for accurately measuring the shut heights of presses.

Another object of the instant invention is to provide an indicating device for simplifying press shut height adjustments.

Another object of the instant invention is to provide a device for measuring the shut height of a press wherein an indicator dial of the device is maintained at a shut height reading after the press has passed the shut height position of its cycle.

A still further object of the instant invention is to provide a shut height indicating device having a frictional clutch element which adjustably maintains a shut height measurement on the device.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention.

DESCRIPTION OF THE INVENTION

Figure 1:
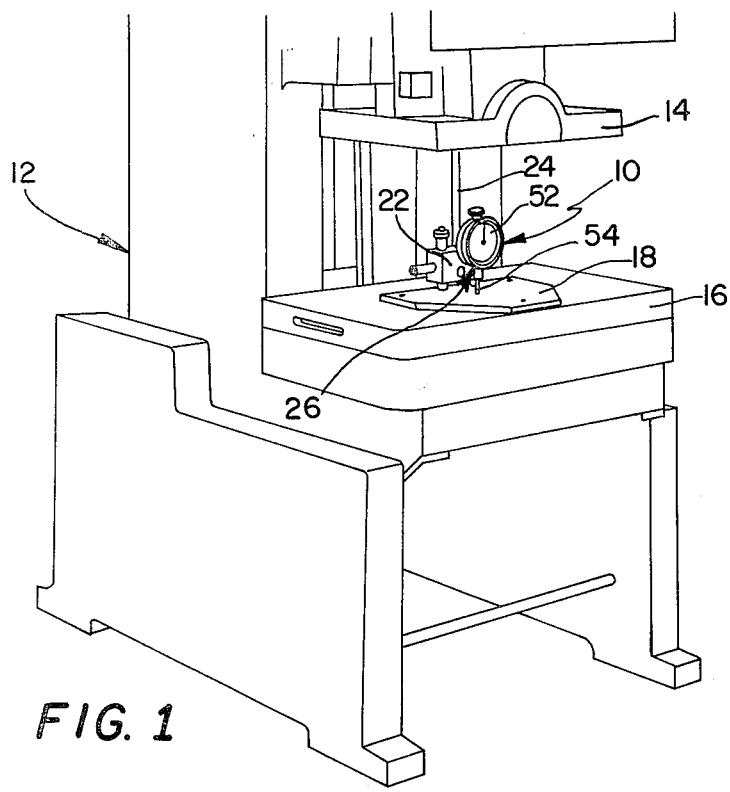
FIG. 1 is a perspective view of the device of the instant invention as it is used in measuring the shut height of a press.

Referring now to the drawing, the shut height measuring device of the instant invention is generally indicated at 10 in FIGS. 1 through 6. The device 10 is operable for accurately measuring the shut height of a press of the type generally indicated at 12 in FIG. 1.

The press 12 comprises a conventional press of the type widely used in the manufacturing industry and includes a ram 14 which is adapted for reciprocating movement towards and away from a bolster plate 16 to effect the desired stamping operation. The ram 14 and the bolster plate 16 are adapted to receive conventional cooperative die set elements (not shown) to effect stamping in a conventional manner. More particularly, the ram is adapted to carry a die set punch in its reciprocating movement while the bolster plate is adapted to maintain a die set die in registry therewith so that material interposed between the punch and the die is thereby engaged to effect the desired forming of the material. The press 12 is adjustable to vary the lowermost ram position in its reciprocating travel, and accordingly, the shut height of the press 12 is adjustable for die set elements of different dimensions. It is understood, however, that the device 10 of the instant invention is also usable to effect shut height measurement on other types of presses, for instance, those wherein the bolster plate height is adjustable.

The device 10 generally comprises a base 18, a pair of posts 20 which extend upwardly from the base 18, a slide block 22 which is slidably mounted on the posts 20, a pair of clutch assemblies generally indicated at 23 which are attached to the block 22, a slide rod 24 which extends upwardly from the block 22, and a measuring element generally indicated at 26.

The base 18 comprises a substantially flat metallic plate which is positionable on the bolster plate 16. The posts 20 are also preferably made of a suitable metal and are secured to the base 18 extending substantially perpendicularly upwardly therefrom in substantially parallel spaced relation. Threaded openings 28 are provided extending substantially axially inwardly from the terminal ends of the posts 20 and threaded allen socket machine screws 30 are received in threaded engagement in the openings 28 and have circular stop members 32 thereon which are of slightly greater peripheral dimensions than the posts 20.

The slide block 22 is also preferably of metallic construction and has a pair of substantially parallel spaced openings 34 therethrough which are dimensioned to slidingly receive the posts 20, but which are of smaller dimensions than the peripheries of the stop members 32. Accordingly, the block 22 is slidably received on the posts 20 with the stop members 32 limiting the extent of its upward travel thereon. Side openings 36 are provided in the block 22 in communication with the openings 34 for receiving the clutch assemblies 23 as will hereinafter be brought out. A threaded opening 38 is provided on the upper side of the block 22 and a reduced threaded end 40 is provided on the rod 24 whereby the rod 24 is detachably received in threaded engagement in the opening 38. The rod 24 is disposed on the device 10 so that it is in substantially parallel relation to the posts 20 and in substantially perpendicular relation to the base 18. The rod 24 terminates in an upper terminal end 41 which defines the upper extremity of the device 10. Additional rods 42, 43 and 44, which are of similar configuration to the rod 24 but of different lengths and which are alternatively receivable in the opening 38 are detachably secured to the base 18, as by being received in threaded engagement in openings in said base.

The clutch assemblies 23 comprise tubular sleeves 45, friction elements 46, coil springs 47 and retainer screws 48. The sleeves 45 are secured to the block 22 in the openings 36 and have threaded female outer ends 50. The retainer screws 48 are received in the outer ends 50 and retain the coil springs 47 in pressurized engagement with the elements 46 to urge the elements 46 into pressurized frictional engagement with the posts 20. In this connection, the frictional elements 46 are preferably made of brass or some other suitable relatively soft metal and are preferably formed with arcuate inner surfaces which frictionally engage the posts 20 to movably retain the slide block 22 at various relative positions thereon.

The measuring element 26 comprises a conventional dial indicator having a dial portion 52 and a downwardly biased plunger portion 54 which has a lower teminal end 56 and which extends upwardly through the dial portion 52 terminating in an upper knob 58. The measuring element 26 is mounted on the block 22 so that the terminal end 56 engages the base 18 with the plunger portion 54 substantially perpendicular thereto.

Figure 3:
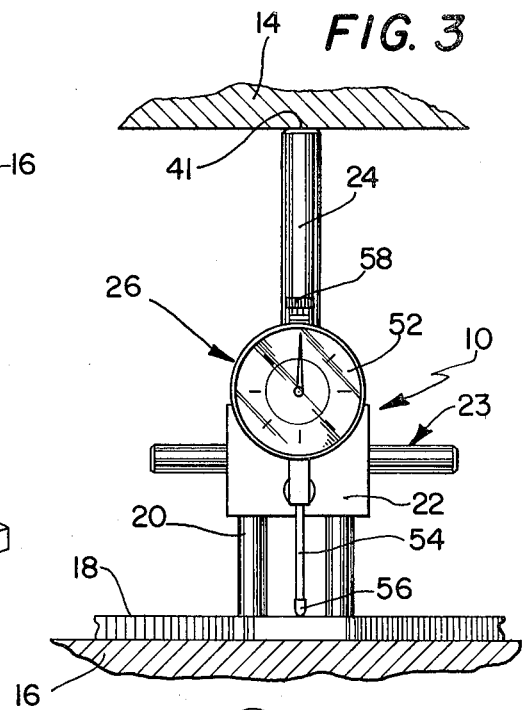
FIG. 3 is a front elevational view of the device in engagement with the bolster plate and the ram of a press.
Figure 2:
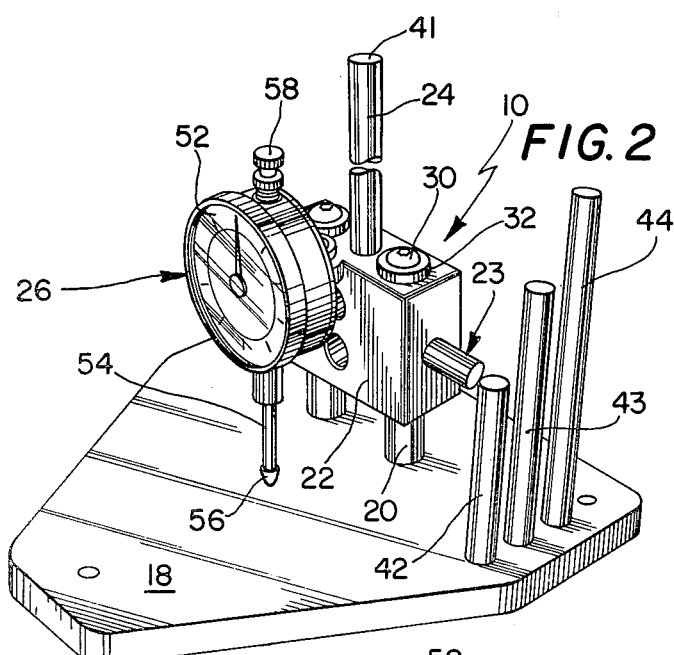
FIG. 2 is a perspective view of the device per se.
Figure 4:
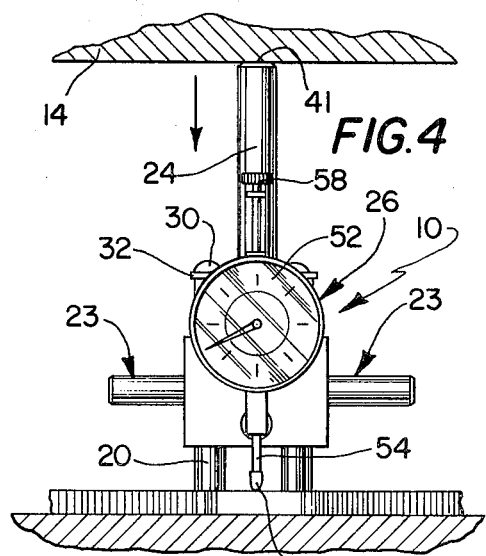
FIG. 4 is a similar view with the ram in its shut position.
Figure 5:
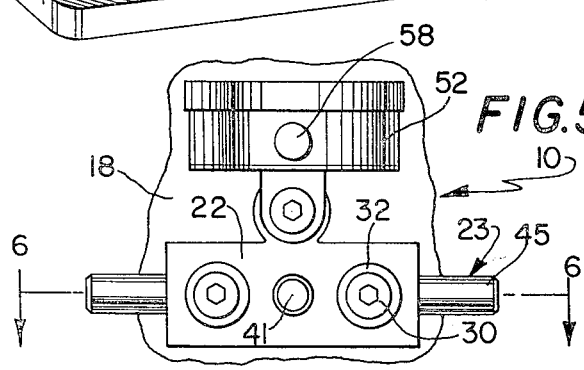
FIG. 5 is a fragmentary top plan view of the device per se.
Figure 6:
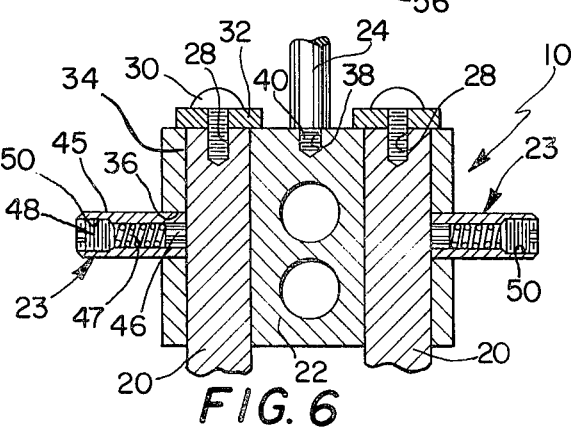
FIG. 6 is a sectional view taken along line 6—6 in FIG. 5.

In operation, the device 10 is positioned with the base 18 on the bolster plate 16, as illustrated in FIG. 1. The press 12 is then cycled so that the ram 14 engages the upper end 41 of the rod 24 as illustrated in FIG. 3. As the press 12 is further cycled to move the ram 14 downwardly to its lowermost position, the rod 24 is moved downwardly causing the block 22 to slide downwardly on the posts 20 and thereby causing the plunger portion 54 to move upwardly through the indicator portion 52 to produce a measurement reading thereon, as illustrated in FIG. 4. As the ram 14 is thereafter advanced through its cycle, the clutch assemblies 23 retain the device 10 in the shut height position to facilitate the reading of the indicator portion 52. Specifically, the friction elements 46 frictionally engage the rods 20 to movably retain the block 22 at a relative position thereon which corresponds to the shut height of the press 12. When using this procedure to measure shut heights which are not within the specific range of the device 10 as embodied with the rod 24, one of the rods 42, 43 or 44 can be substituted for the rod 24 to shift the range either upwardly or downwardly, as desired.

The reading produced by the indicator portion 52 during the above described measurement operation, however, is only a relative value and does not represent the true shut height of the press 12. More specifically, since in the device 10, as herein embodied, the measuring element 26 is mounted on the block 22 and the block 22 is limited in its travel on the rods 20 by the stop members 32, the element 26 is preferably set for a zero reading when the block 22 is in its uppermost position (when it is in engagement with the stop members) and for a maximum reading when the block 22 is in its lowermost position (when it is in engagement with the base 18). Consequently, the measuring element 26 in the device 10, as herein embodied, is adapted to measure the distance between the stop members 32 and the upper surface of the block 22 at various relative positions of the block 22. In order to convert the reading produced by the indicator portion 52 to a true shut height reading, it is necessary to subtract it from the fixed value representing the distance between the bottom surface of the base 18 and the terminal end 41 when the block 22 is in its uppermost position. As a practical matter, however, absolute shut height measurements may be unnecessary and it may frequently be more convenient to work in relative shut height values as indicated directly by the measuring element 26, when initially preparing shut height data and when performing subsequent press adjustments.

The measuring device 10 is an effective time saving apparatus for press setup adjustment applications. In this regard, the first time a particular die set is used in a particular press, the shut height of the press must be adjusted by conventional trial and error techniques to achieve the desired pressing effect. However, by utilizing the device 10 to measure the shut height at the adjusted setting, the desired setting may be recorded and subsequent trial and error adjustments may be eliminated. In particular, when setting up the same press with the same die set elements at a later time, the press may be set to the desired shut height utilizing the device 10 by adjusting the shut position of the press until the desired reading is obtained on the indicator portion 52.

It is seen therefore that the instant invention provides a novel device which is simple in its operation and nevertheless effective for accurately measuring the shut heights of presses. The device 10 is useable to effect quick and accurate press adjustments for various die sets. Hence, the device 10 virtually eliminates the necessity of using the heretofore known time consuming trial and error press adjustment procedures and it therefore represents a significant improvement in the art which has substantial commercial merit.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for measuring the shut height of a press of the type having upper and lower press members which are adapted to carry upper and lower material engaging elements wherein at least one of the press members is movable toward and away from the other to effect the corresponding engagement and disengagement of the elements with material interposed therebetween, said device comprising:
    (a) a substantially flat base on said lower press member;
    (b) a post which extends upwardly and substantially perpendicularly from said base;
    (c) a slide member which is slidably mounted on said post and extends a distance therebeyond; and
    (d) measuring means responsive to movement of said slide member for measuring and indicating the position of said slide member relative to said base, said measuring means being mounted on said slide member and having a plunger portion which engages said base to determine the position of said slide member relative to said base, whereby when said press members are in their shut height positions and said slide member is in engagement with the upper press member, the measurement of said measuring means corresponds to the shut height of said press.

2. A device for measuring the shut height of a press of the type having upper and lower press members which are adapted to carry upper and lower material engaging elements wherein at least one of the press members is movable toward and away from the other to effect the corresponding engagement and disengagement of the elements with material interposed therebetween, said device comprising:
    (a) a substantially flat base on said lower press member;
    (b) a post which extends upwardly and substantially perpendicularly from said base;
    (c) a slide member which is slidably mounted on said post and extends a distance therebeyond; and
    (d) measuring means responsive to movement of said slide member for measuring and indicating the position of said slide member relative to said base, said measuring means comprising a dial indicator having dial and plunger portions, the dial portion of said dial indicator being mounted on said slide member so that the terminal end of the plunger portion engages said base, whereby when said press members are in their shut height positions and said slide member is in engagement with the upper press member, the measurement of said measuring means corresponds to the shut height of said press.

3. A device for measuring the shut height of a press of the type having upper and lower press members which are adapted to carry upper and lower material engaging elements wherein at least one of the press members is movable toward and away from the other to effect the corresponding engagement and disengagement of the elements with material interposed therebetween, said device comprising:
    (a) a substantially flat base on said lower press member;
    (b) a post which extends upwardly and substantially perpendicularly from said base;

(c) a slide member which is slidably mounted on said post and extends a distance therebeyond; and
(d) clutch means attached to said slide member and frictionally engaging said post to movably secure said slide member thereto; and
(e) measuring means responsive to movement of said slide member for measuring and indicating the position of said slide member relative to said base whereby when said press members are in their shut height positions and said slide member is in engagement with the upper press member, the measurement of said measuring means corresponds to the shut height of said press.

4. In the device of claim 3, said slide member comprising:
   (a) a slide block which is slidably mounted on said post and has said measuring means mounted thereon; and
   (b) a slide rod which is detachably secured to said block and which extends a distance therefrom having a terminal end which defines the uppermost extremity of said slide member.

5. A device for measuring the shut height of a press of the type having upper and lower press members which are adapted to carry upper and lower material engaging elements wherein at least one of the press members is movable toward and away from the other to effect the corresponding engagement and disengagement of the elements with material interposed therebetween, said device comprising:
   (a) a substantially flat base on said lower press member;
   (b) a post which extends upwardly and substantially perpendicularly from said base;
   (c) a slide member which is slidably mounted on said post and extends a distance therebeyond, said slide member comprising:
      i. a slide block which is slidably mounted on said post and has said measuring means mounted thereon; and
      ii. a slide rod which is detachably secured to said block and which extends upwardly a predetermined distance therefrom having a terminal end which defines the uppermost extremity of said slide member, said terminal end being a predetermined distance from said lower press member when said slide member is in the uppermost position thereof;
   (d) means for limiting the upward travel of said slide member on said post; and
   (e) measuring means mounted on said slide member and responsive to movement of said slide member for measuring and indicating the distance of downward travel of said slide member from said limiting means, which distance is representative of the position of said slide member relative to said base and corresponds to the shut height of said press.

* * * * *